Figure 1:
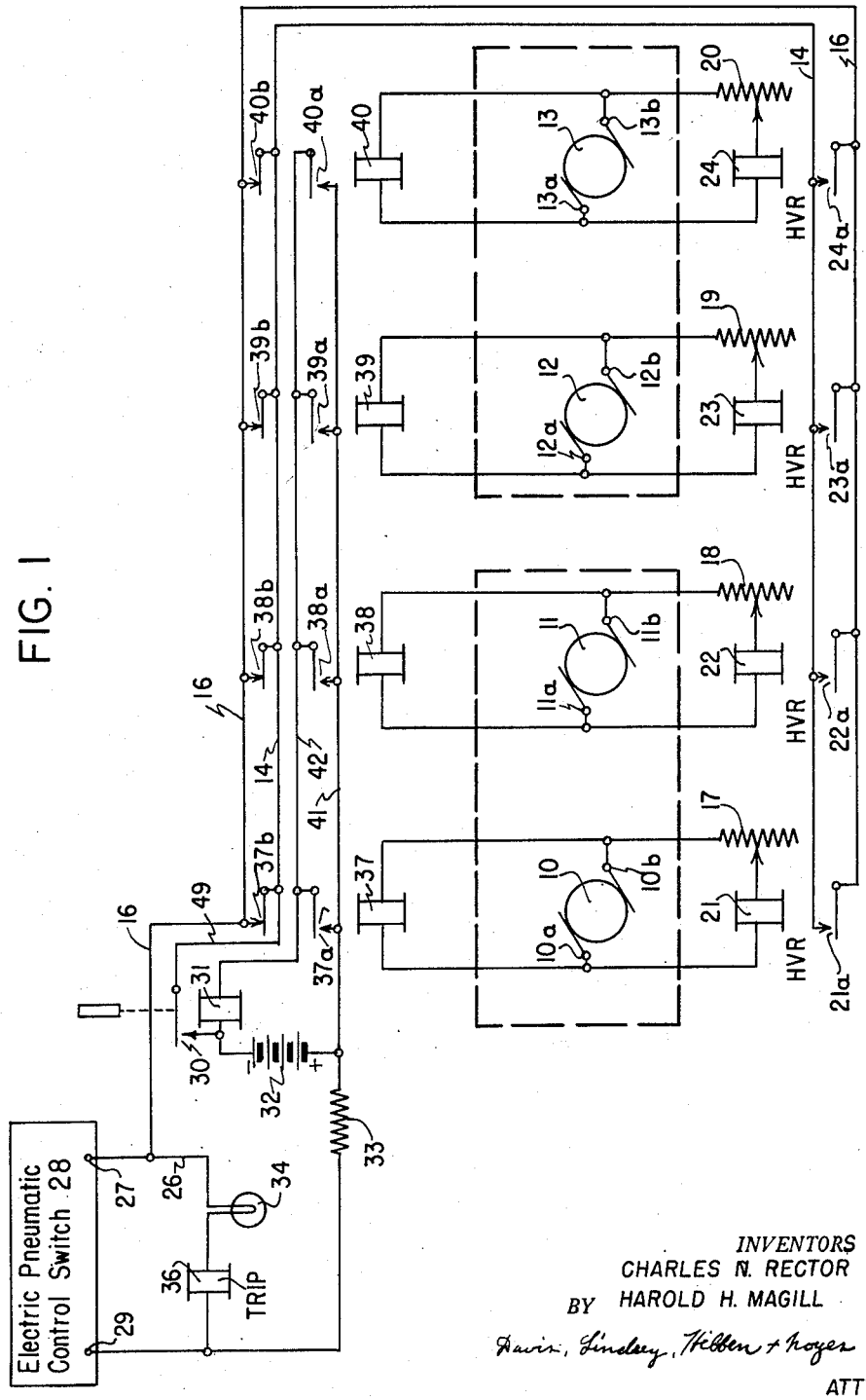

March 9, 1954

H. H. MAGILL ET AL 2,671,878

ELECTRICAL SAFETY CONTROL MECHANISM
FOR ELECTRIC LOCOMOTIVES

Filed Oct. 21, 1949

2 Sheets-Sheet 1

INVENTORS
CHARLES N. RECTOR
BY HAROLD H. MAGILL

ATTYS.

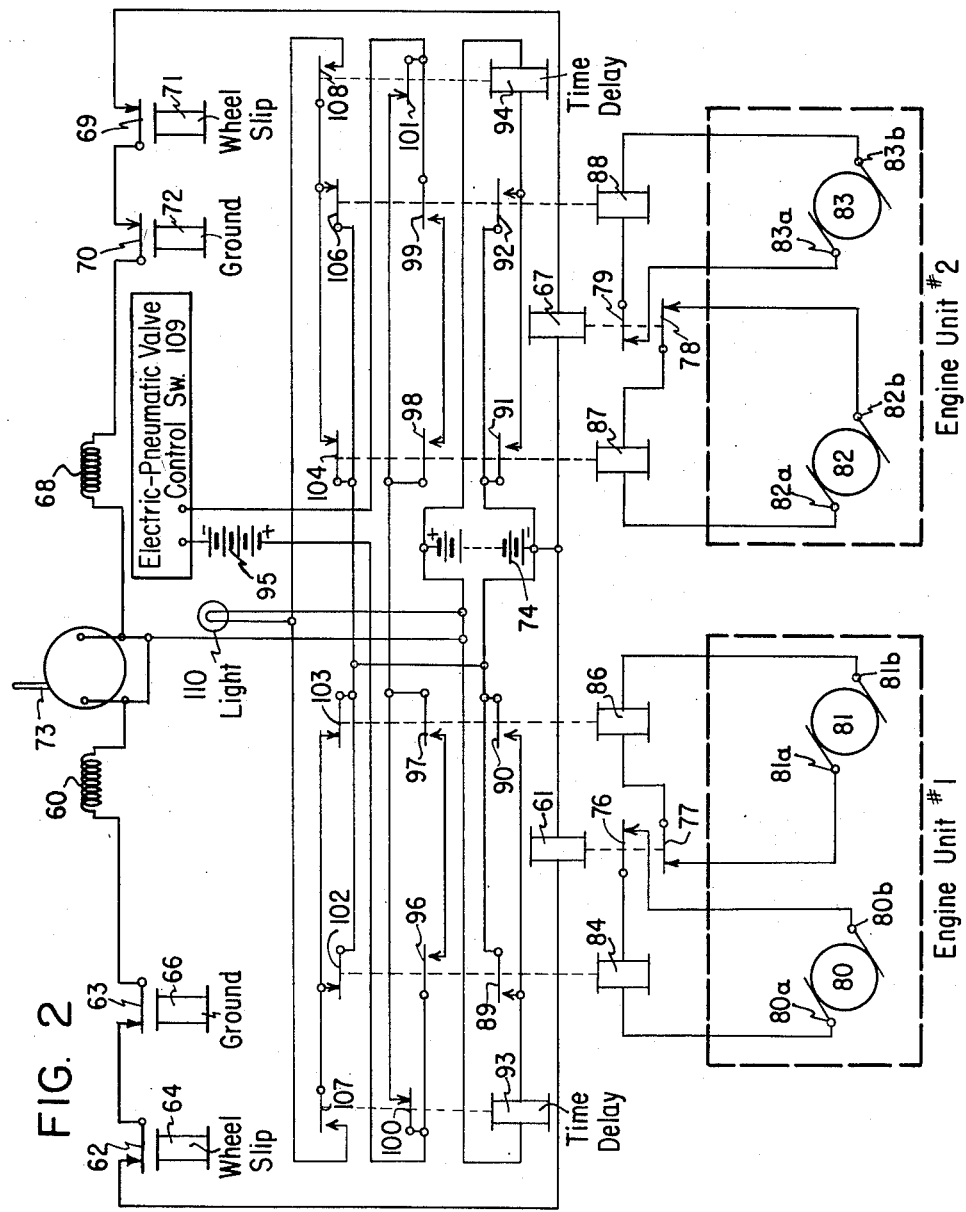

Patented Mar. 9, 1954

2,671,878

UNITED STATES PATENT OFFICE 2,671,878

ELECTRICAL SAFETY CONTROL MECHANISM FOR ELECTRIC LOCOMOTIVES

Harold H. Magill, Oak Park, and Charles N. Rector, Chicago, Ill.; said Rector assignor to said Magill Application October 21, 1949, Serial No. 122,752

11 Claims. (Cl. 318—52)

This invention relates to safety control devices and signalling mechanisms and more particularly to an electrically operated, safety control and signalling mechanism adapted for application to diesel-electric railroad locomotives, electrically propelled vehicles and the like.

In the operation of diesel-electric railroad locomotives, the axles and wheels comprising the wheel assemblies thereof which are directly connected to and driven by electric traction motors through a ring gear, pinion gears and other parts, sometimes become locked against rotation by bearing failure or for other reasons so that the electric motor associated therewith also becomes locked against rotation and the wheels skid or slide along the rails forcing the driving load on the other driving wheels which is necessarily increased by the skidding resistance. Such a condition, if not noticed immediately by the engineer so as to bring the locomotive to an immediate halt, quite often results in damage to the locked motor by the electric current forced into the motor by its associated generator and also in damage to other operating parts and the rails and even in derailment and severe damage to the locomotive and the cars of the train.

It also sometimes happens that the ring gear drivingly connecting the motors with the wheel assemblies sometimes slips or breaks loose so that the electric motor, not being under any driving load, races to an excessive R. P. M. so as to become damaged and burn itself out. Such a condition also requires immediate attention by the engineer.

It is, therefore, one of the objects of the present invention to provide an electrically operated safety control mechanism for diesel-electric railroad locomotives, electrically propelled vehicles and the like in accordance with which the brakes of the locomotive or vehicle or any other type of safety device or signalling means may be automatically applied or operated upon breakage of the driving connection, such as by slippage of the ring gear, between the electric motor and the wheel assemblies or upon locking of the wheels, axles, bearings or motors against rotation.

Another object is to provide a safety control or signalling mechanism of the foregoing character which is electrically controlled by and responsive to the reaction or back voltage generated by the armature of an electric motor of such vehicles.

Another object is to provide a safety control or signalling mechanism of the foregoing character which is electrically controlled and responsive to the failure of any motor drivingly connected with a set of locked wheels to generate a reaction or back voltage.

Another object is to provide a safety control or signalling mechanism of the foregoing character which is electrically controlled and responsive to the failure of one driving motor to generate a reaction or back voltage and to the generation of such voltage by the other driving motors.

Still another object of the present invention is to provide a safety control device which is in a normally energized circuit which is adapted to be deenergized for operation of the device upon failure of the driving motor of a locked set of wheels to generate a reaction or back voltage.

Another object of the present invention is to provide a safety control device which is in a normally deenergized circuit which is adapted to be energized for operation of the device upon failure of the driving motor of a locked set of wheels to generate a reaction or back voltage.

Still another object is to provide a safety control or signalling mechanism of the foregoing character controlled by and responsive to the reaction or back voltage of the motor armature and comprising a high voltage relay in circuit with the safety device and adapted for operation when a high reaction voltage is generated by the armature as it spins freely at a high R. P. M. after breakage or slippage of the driving connection between the motor and the wheel assemblies.

A further object is to provide an electrically operated safety control or signalling mechanism of the foregoing character for such vehicles having a plurality of electric motors drivingly connected to a plurality of driving wheels, respectively, and adapted for operation of a safety device in the event of locking of any one of the wheel assemblies thereof against rotation or slippage or breakage of the driving connections between any one of the motors and its associated wheel assembly.

Another further object is to provide an electrically operated safety control mechanism of the foregoing character having a safety device in a circuit conditioned for automatic operation upon initial rotation of the armature of any motor and operable upon the failure of rotation of the armature of any motor.

Other and further objects and advantages of the invention will become apparent as this description progresses, reference being had to the accompanying drawings in which:

Figure 1 comprises a circuit diagram of an electrically operated safety control mechanism comprising one embodiment of the present invention; and Figure 2 is a circuit diagram of an electrically operated brake applying and signalling mechanism comprising a second embodiment of the invention.

The electrically operated safety control and signalling mechanisms for electrically propelled railroad locomotives, vehicles and the like shown in the circuit diagrams in the drawings are particularly adapted for application to diesel-electric locomotives of the well known type in common and extensive use on American railroads today. Such type of diesel-electric locomotive usually comprises two diesel engines which drive electric generators which in turn provide the electric driving current for four electric traction motors. The traction motors are in direct, operable driving connection with the driving wheels of the locomotive through appropriate gearing including a ring and pinion gears. Each diesel-electric locomotive unit normally comprises four sets of driving wheels, there being a separate electric traction motor for each set of driving wheels and a generator for each traction motor. Such diesel-electric locomotive units are also customarily provided with an air brake system which may be operated either manually by the engineer to apply or release the brakes or automatically, for instance, by a speed recorder device when the locomotive attains an excessive speed. The present invention contemplates the application of an additional means of automatic brake application in the event of a locked wheel or slipping ring gear.

In the circuit diagram of Fig. 1 of the drawings comprising one embodiment of the present invention, the four traction motors 10, 11, 12 and 13 are adapted to be connected to electric leads 14 and 16 through the resistors 17, 18, 19 and 20 of each motor, respectively, and through high voltage relays 21, 22, 23 and 24 having normally open contactors 21a, 22a, 23a and 24a, respectively. The leads which connect each of the motors with the high voltage relays are connected to armature leads 10a and 10b, 11a and 11b, 12a and 12b and 13a and 13b, respectively, which are operably connected to the armatures of the respective motors. The electric current which passes from the electric motors 10, 11, 12 and 13 to operate the relays 21, 22, 23 and 24 and the other parts of the electrical safety control system to be described hereinafter is the reactive or back voltage or counter current which is generated by normal operation of the armatures of the motors. This reactive voltage may be of relatively low degree at motor operation at low speeds and consequently the entire system is operable at relatively low initial voltages and at higher voltages thereafter when the motors are at higher speeds. The operation of the system comprising a preferred embodiment of the present invention depends therefore upon rotation or non-rotation of the armatures of the respective motors and is directly responsive thereto.

The lead 16 is connected to a short lead which is connected in turn to a terminal 27 of an electric pneumatic control switch 28. The lead 14 is connected to the terminal 29 of the electric pneumatic switch 28 through a contactor 30 of a time delay relay 31, a battery 32 and a resistor 33, this circuit being closed when the normally open contactor 30 of the time delay relay 31 is closed, as will be hereinafter explained in detail, upon initial operation of the locomotive. The switch 28 may be of the conventional type having a solenoid adapted to be energized or de-energized by the flow or non-flow of electric current therethrough. The solenoid of the control switch 28 is normally de-energized when the locomotive is standing still, and hence the air brake valve (not shown) which is normally closed and which is magnetically controlled by the solenoid will be in closed position, the air brakes thus being inoperative. However, when the solenoid is energized, the air brake valve will be opened and the brakes will be automatically applied to stop the locomotive.

The portion of the electrical safety control system which has been described thus far is particularly directed to the protection of the traction motors in the event of breakage or slippage of the ring gear or any of the operable driving connections between the traction motors 10, 11, 12 or 13 and the driving wheels of the locomotive and also to indication of that breakage and the necessity of repair. In the event any of the driving connections between any one of the traction motors and the driving wheels should break so that the traction motor is not under load, the traction motor due to the continued passage of the high voltage current thereinto from its generator commences to rotate at a very high R. P. M. and as a consequence would burn itself out were it not for the safety control mechanism above described. When such breakage occurs with the present safety mechanism with respect to motor 11, for example, the reaction voltage of this unloaded motor across its armature contacts 11a and 11b rapidly increases to such an extent that the high voltage relay 22 is operated to close its contactor 22a, thereby electrically connecting the leads 14 and 16. The electric circuit is thus closed, contactor 30 of relay 31 also being closed, to energize the solenoid of the electric pneumatic control switch 28 which in turn automatically opens the air valve to apply the brakes and stop the locomotive.

The air brakes therefore are set automatically shortly after such slippage of the ring gear in ample time to prevent the particular traction motor from burning out or otherwise damaging itself. It is understood, of course, that the engineer of the locomotive immediately becomes fully aware of the automatic application of the brakes and that the driving motors are thereafter controlled accordingly. It is to be further understood that the portion of the electrical system above described could very well be utilized for the operation of a signal light mounted in the cab of the locomotive. The signal light shown in the drawing by the numeral 34 could be substituted entirely for the control switch 28, where automatic brake application was not desired, or may be operated in conjunction therewith. To accomplish this conjuctive operation, the signal light 34 may be connected to the terminals 27 and 29 of the switch 28 through a trip relay 36 in accordance with which the warning light 31 may be caused to light up as the air brakes are being applied. The light 31 may be connected to the system in a similar way and operated in a similar manner in the event the switch 28 is eliminated.

The other portion of the electrical safety control system which will now be described, serves to effect operation of the air brake switch 28 and thereby automatically apply the air brakes and also to effect operation of the signal light 34, in the event the bearings, axle or wheels of the wheel assembly operably connected with the traction motor become locked and will not rotate. The armature leads 10a and 10b, 11a and 11b, 12a and 12b, and 13a and 13b of each of the motors 10, 11, 12 and 13 are connected to low voltage relays 37, 38, 39 and 40, respectively. Each of the low voltage relays is provided with two contactors, the contactors 37a, 38a, 39a and 40a, thereof, respectively, being normally open when the locomotive is standing still on the tracks and the contacts 37b, 38b, 39b and 40b thereof, respectively, being normally closed under such conditions. The normally closed contacts 37b, 38b, 39b and 40b are each connected in parallel to leads 14 and 16.

Each of the normally open contacts 37a, 38a, 39a and 40a of the low voltage relays are connected in parallel to leads 41 and 42, the lead 42 being connected to the coil of the time delay relay 31 and the lead 41 being connected to the battery 32. The time delay relay 31 may be of conventional form having an adjustable dash pot for delaying the closing action of the normally open relay contactor 30 when the relay is energized by closing of any one of the normally open contactors 37a, 38a, 39a and 40a of the low voltage relays 37, 38, 39 and 40.

The operation of this other portion of the safety control circuit may be readily understood from the foregoing description. When the throttle of the locomotive is opened, a short period of time, approximately five seconds, will elapse before the armature of any one of the traction motors 10, 11, 12 and 13 rotates and consequently no reaction or back voltage will occur across the armature contacts thereof. However, when armature rotation of any one of the traction motors, motor 11, for example, is sufficient to build up a reaction voltage of one and two tenths (1.2) volts across the contacts 11a and 11b, which occurs at a locomotive speed of approximately one mile per hour, the low voltage relay 38, which is adapted for operation at that low voltage, will be energized closing the contactor 38a and thus completing the circuit through the time delay relay 31 to energize the same. At the same time the normally closed contact 38b will open. The delay relay contactor 30 will not close, however, until time for action of the dash pot has expired, this being set anywhere from one to one hundred eighty seconds, in order that the other low voltage contactors 37a, 39a and 40a will have sufficient time to close and the other contactors 37b, 39b and 40b will have time to open thereby breaking the circuit to switch 28 and preventing brake application. When the time delay relay 31 finally closes, which is shortly after the locomotive is in running condition, all the normally opened and normally closed contactors of the low voltage relays 37, 38, 39 and 40 are closed and opened, respectively, and the circuit is now conditioned for automatic operation of the switch 28 in the event of a locked wheel or axle. It is to be understood, however, that because of the reaction or back voltages obtained from the armature reaction at normal running speeds under load are of such a limited degree, the high voltage relays 21, 22, 23 and 24 remain inoperable.

If for any reason whatsoever after the locomotive is in full operation at an average running speed, the axle, wheels or bearings of any wheel assembly of the locomotive become locked and cease rotation, the corresponding traction motor will likewise become locked against rotation. When this occurs armature rotation likewise ceases with the result that all reaction or back voltage across the armature contacts of that particular motor ceases or is reduced to zero. If the traction motor 12, for instance, is locked against operation, no reaction voltage will exist across the armature contacts 12a and 12b and hence the contactor 39a of the relay 39 will restore to normal open position and the contactor 39b will restore to normal closed position permitting a battery current to flow through the electropneumatic valve 28 to operate the same and initiate automatic application of the air brakes and also operation of the warning light 34. It is to be understood that even though relay contactor 39b closes at this time, the time delay relay circuit is still closed and the delay relay 31 is still energized to keep the contactor 30 closed, because the contactors 37a, 38a and 40a of the other three motors 10, 11 and 13 are still closed as a reaction or back armature voltage is still being generated by those motors. Hence, when the contactor 39b closes a current flows from the battery 32 through the resistor 33, the electric pneumatic switch 28 to operate the same, through lead 16, through contactor 39b, lead 14, closed contactor 30 of relay 31 and back to the battery 46. At the same time, current flows through the trip relay 36 and the connecting leads to operate the signal light 34.

Thus, the air brakes of the locomotive are automatically applied as the wheels, axle bearings and traction motor of any particular driving wheel assembly are locked against rotation and the locomotive is brought to a stop for inspection and repair. The signal light 34 also warns the engineer and may be operated with or without brake application.

In the event any one of the relays 37, 38, 39 and 40 during initial starting of the locomotive fails to operate so as to open and close the respective contactors thereof during the delayed closing action of switch 30 of the time delay relay 31, a brake applying circuit similar to that above-described will be completed as soon as the time delay relay contactor 30 is closed and the air brakes will be automatically applied indicating locked or sticking wheels or bearings during the start of the locomotive.

After the locomotive is in running condition, all the relays 37, 38, 39 and 40 are energized through the armature reaction current and the circuit is conditioned for automatic operation of the air brake system through the switch 28. Since only the armature reaction voltage is used, the system is directly responsive to motor operation which is directly and first affected by ring gear slippage or breakage or by locked wheels, axles or bearings. The system at the same time permits and in no way affects normal operation of the locomotive. For example, if the locomotive were running at a speed of sixty (60) miles per hour and the throttle were put in idling position, the armature reaction voltage would drop from approximately 700 to 15 volts, the latter voltage resulting from idling motor rotation and still being sufficiently great to energize the four low voltage relays. This permits the locomotive to coast without resulting in an automatic brake operation and permits the engineer to pursue normal manual brake operation from an almost stopped condition to an excessive running speed of 117 miles per hour. The electropneumatic switch 28 will therefore only be applied or the signal light 34 will only be lighted as above described if the driving connections break between any one of the motors and the driving wheels or if the driving wheels, axle or bearings become locked, the automatic brake applying or light lighting circuit being conditioned upon initial motor operation. As soon as the locomotive is stopped, all the contactors of the relays 31, 37, 38, 39 and 40 will be restored to normal and the system must again be conditioned upon initial motor operation. When the locomotive is stopped there will be no brake application or lighting of the light 34 even though the contactors 37b, 38b, 39b and 40b are closed because the time delay relay contactor 30 is now open due to the de-energization of the relay 31 resulting from the opening of the contactors 37a, 38a, 39a and 40a.

In the circuit diagram of Fig. 2 of the drawings, there is illustrated a second embodiment of the present invention in which the electric pneumatic valve control and a signalling means such as a light are also operable in direct response to the back or reaction voltage of the armatures of the traction motors. In other words it is responsive to the generation and the non-generation of such reaction voltage depending upon whether or not a particular motor is in operation. This embodiment, however, does not have provision for actuation of the electric pneumatic valve in the event of slippage of the ring gear or the driving connection between a traction motor and its corresponding wheels, but is directed primarily to a safety control mechanism that is operable in the event of a locked wheel or axle.

In this form, the shunt field contactor coil 60 of the main generator operated by the number one diesel engine may be electrically connected to the coil of a relay 61 through the normally closed contacts 62 and 63 of a wheel slip relay 64 and ground relay 66, respectively. The coil of the relay 61 is connected with the coil of a relay 67 which in turn is connected to the shunt field contactor coil 68 of the main generator operated by the number two diesel engine, through normally closed contacts 69 and 70 of a wheel slip relay 71 and ground relay 72, respectively. The shunt field contactor coils 60 and 68 are connected through the throttle 73 to the negative and positive terminals of a battery 74, and this shunt coil circuit is normally open when the locomotive is standing still on the tracks. However, when the throttle is opened in the cab by the engineer, the circuit is thereby closed and the shunt coils 60 and 68 are energized and current flows through the closed circuit to energize the coils of the relays 61 and 67. As the coils of the relays 61 and 67 are energized, their normally closed contactors 76 and 77 and 78 and 79, respectively, are opened, thus breaking the motor circuits now to be described.

The traction motors 80 and 81 are operable by current supplied by a generator driven by the diesel engine unit one and the traction motors 82 and 83 are operated by current supplied by the generator driven by the diesel engine unit two. The armature leads 80a and 80b of the motor 80 are connected to the coil of a relay 84 through the contactor 76 of the shunt coil circuit relay 61 when the contactor 76 is closed. Similarly the armature leads 81a and 81b of the motor 81 are in circuit with the coil of a relay 86 through the closed contactor 77 of the relay 61; the armature leads 82a and 82b of the motor 82 are in circuit with the coil of the relay 87 through the closed contactor 78 of the relay 67; and the armature leads 83a and 83b of the motor 83 are connected in circuit with the coil of the relay 88 through the closed contactor 79 of the shunt coil circuit relay 67. By the foregoing arrangement, the motor relays 84, 86, 87 and 88 are operable by the reaction or back voltage of the armatures of the motors 80, 81, 82 and 83, respectively, when the contactors 76 and 77 of the shunt circuit relay 61 and the contactors 78 and 79 of the shunt circuit relay 67 are closed. However, as described above these contactors are opened when the locomotive throttle is opened so that these motor relays 84, 86, 87 and 88 are inoperable when the locomotive is in motion and as long as there is no locked wheel or axle.

In the event one of the driving wheels or axles becomes locked against rotation and slides along the rails, the wheel slip relays 64 and 71 or the ground relays 66 and 72 will be operated in the usual manner well understood in the art. The wheel slip relay being operated when a difference in voltage occurs between two traction motors and the ground relay being operable upon the grounding of any part of the circuit, and thus one of the normally closed contactors 62, 63, 69 or 70 will open. The shunt coil circuit being a series circuit, the coils of the relays 61 and 67 will thereupon be de-energized, permitting the contactors 76 and 77 and 78 and 79, respectively, which were opened by opening the throttle, to close, thus permitting operation of the motor relays 84, 86, 87 and 88, with the exception of the motor relay of that particular traction motor which is not now in operation due to the locked driving wheel and axle.

The motor relays 84, 86, 87 and 88 are each provided with three sets of contactors. One set comprises normally open contactors 89, 90, 91 and 92, respectively, which are in circuit with the coils of time delay relays 93 and 94; the second set comprises normally open contactors 96, 97, 98 and 99, respectively, which are in circuit with normally closed contactors 100 and 101 of the time delay relays 93 and 94, respectively; and the third set comprises normally closed contactors 102, 103, 104 and 106 which are in circuit with normally open contactors 107 and 108, respectively, of the time delay relays 93 and 94, respectively. The contactors 96, 97, 98, 99, 100 and 101 are in circuit and connected to an electrical pneumatic valve control switch 109 while the contactors 102, 103, 104, 106, 107 and 108 are in circuit with the signaling light 110. The source of power for operation of the signaling light 110 is derived from the battery 74, a lead from the light 110 being connected to the positive side thereof and another lead from the light 110 being connected to a lead extending between the contactors 107 and 108 of the time delay relays 93 and 94, respectively. The source of electric power for operation of the electric pneumatic valve control switch 109 is derived from a battery 95 interposed in the line adjacent the control switch 109.

In the event the wheels which are drivingly connected to the traction motor 81 become locked against rotation, one of the wheel slip or ground relays 64, 66, 71 and 72 will become operable and open one of the contacts 62, 63, 69 or 70 thereof, thus breaking the circuit through the shunt coil relays 61 and 67 to de-energize the same. This permits the contacts 76, 77, 78 and 79 of the motor circuits to return to normal closed position with the result that the coils of relays 84, 87 and 88 will be energized. However, inasmuch as motor 81 is locked against rotation, there is no reaction or back voltage across the leads for operation of the relay 86 with the result that the normally open contacts 90 and 97 of the relay 86 will remain open and the normally closed contact 103 thereof will remain closed.

However, when the relays 84, 87 and 88 are energized, the normally open contactors 89 and 96, and 91 and 98, and 92 and 99, respectively, will be closed and their normally closed contactors 102, 104 and 106, respectively, will be opened. When the contactors 89, 91 and 92 of the motor relays are closed the coils of the time delay relays 93 and 94 will be energized with the result that the normally closed contactors 100 and 101 of the time delay relays 93 and 94, respectively, will be opened and their normally opened contactors 107 and 108 will be closed.

When the relays above mentioned have been operated for opening and closing their respective contacts, the electric pneumatic valve contactor switch 109 and the signaling light 110, which comprise the safety devices, will be operated. Since the contactor 103 of the motor relay 86 of the locked motor 81 remains closed, the circuit through the signaling light 110, the battery 74, the closed contactor 103 is completed upon closing of the contactor 107 when the time delay relay is energized, by the reaction voltage of the operating motors 80, 82 and 83. Thus, as the wheels in driving connection with the motor 81 become locked, the signaling light 110 in the cab of the locomotive will light, thus warning the engineer of the existence of that dangerous condition.

The electric pneumatic valve control switch 109 is in a normally energized circuit so that in the event any one of the wheels becomes locked to prevent operation of a motor, motor 81 for example, that circuit will be broken so that the valve control switch will be de-energized, thus permitting the air valve to open for automatic application of the brakes. The electric pneumatic valve control switch 109 is arranged in series with the contactors 96, 97, 98 and 99 of the motor relays 84, 86, 87 and 88 so that when any one of those contactors remains open, contactor 97 for example, the circuit will be broken. Inasmuch as the normally closed contactors 100 and 101 of the time delay relays are open when the time delay relays 93 and 94 are energized through operation of the motor relays 84, 87 and 88, no current can flow therethrough so as to bypass the contactors 96, 97, 98 and 99. Thus, at the time time that the signal light 110 is lighted, the air brakes will be automatically applied as the electric pneumatic valve control circuit is broken by failure of the relay contactor 97 of the motor 81 which is inoperable, to close.

The operation of the electric safety control device is the same in the event of locking of the wheels connected to any one of the other motors 80, 82 and 83. In such event, the relay of the particular motor that is locked against operation will not be energized so that the contactor of the valve control switch circuit will remain open so as to deenergize the valve control and open the air valve, and its corresponding contactor of the signal light circuit will remain closed to complete the circuit to the light. The relays 61 and 64 serve to keep the heavy voltage and amperage of the main generators out of the safety control circuit.

Although there have been described above and illustrated diagrammatically in the drawings two embodiments of an electrically operated safety control and signaling mechanism for diesel-electric locomotives, vehicles and the like, it is to be understood that changes and modifications may be made in the details and mode of operation thereof without departing from the spirit and scope of the appended claims.

We claim:

1. An electrically operated safety mechanism for electrically propelled locomotives, vehicles and the like having a plurality of wheel assemblies and a plurality of electric motors drivingly connected with said wheel assemblies, said mechanism being operable upon the locking of the wheel assembly and the motor against rotation and comprising an electrically operated safety device, a relay associated with each said motor and electrically connected to the armature terminals thereof and having a normally open contactor and a normally closed contactor responsive to the armature reaction voltage of said associated motor and another relay having a normally open contactor, the normally open contactors of said motor relays being arranged in parallel with each other and connected in series with said other relay and adapted to close at a predetermined armature reaction voltage and the contactor of said other relay being adapted to close upon energization of said other relay by closing of said normally open contactor of any of said motor relays for conditioning the circuit for automatic operation of said safety device, and the normally closed contactors of said motor relays being arranged in parallel with each other and connected in series with said other relay contactor and in circuit with said safety device and adapted to close upon reduction of the armature reaction voltages when said locking occurs to effect operation of said safety device.

2. An electrically operated safety mechanism for electrically propelled locomotives, vehicles and the like having a plurality of wheel assemblies and a plurality of electric motors drivingly connected with said wheel assemblies, said mechanism being operable upon the locking of the wheel assembly and the motor against rotation and comprising an electrically operated safety device, a relay associated with each said motor and electrically connected to the armature terminals thereof and having a normally open contactor and a normally closed contactor responsive to the armature reaction voltage of said associated motor and a time delay relay having a normally open contactor, the normally open contactors of said motor relays being arranged in parallel with each other and connected in series with said time delay relay and adapted to close at a predetermined armature reaction voltage, and the contactor of said time-delay relay being adapted to close upon energization of said time-delay relay by closing of said normally open contactor of any of said motor relays for conditioning the circuit for automatic operation of said safety device, and the normally closed contactors of said motor relays being arranged in parallel with each other and connected in series with said time-delay relay contactor and in circuit with said safety device and adapted to close upon reduction of the armature reaction voltage when said locking occurs to effect operation of said safety device.

3. An electrically operated safety mechanism for electrically propelled locomotives, vehicles and the like having a plurality of wheel assemblies and a plurality of electric motors drivingly connected with said wheel assemblies, said mechanism being operable upon the locking of the wheel assembly and the motor against rotation and comprising an electrically operated safety device, a relay having a contactor in circuit with said safety device, a relay associated with each said motor and electrically connected with the armature terminals thereof and having a normally closed contactor and a normally open contactor, said normally open contactors of said motor relays being arranged in parallel with each other and connected in series in a circuit with said first named relay and said normally closed contactors of said motor relays being arranged in parallel with each other and connected in parallel in circuit with said safety device and said contactor of said first named relay, said normally open and closed contactors of said motor relays being adapted to close and open, respectively, upon the generation of an armature reaction voltage to energize said first named relay and close its said contactor to condition the circuit of the safety device for automatic operation, and said normally closed contactors of said motor relays being adapted to close to complete the safety device circuit when the armature reaction voltage is reduced below a predetermined minimum due to locking of the wheels and the motor.

4. An electrically operated safety mechanism for electrically propelled locomotives, vehicles and the like having a plurality of electric motors drivingly connected with a driving wheel assembly, said safety mechanism being operable upon cessation of operation of said motor resulting from the locking of any one of said wheel assemblies against rotation and comprising an electrically operated safety device in a normally energized circuit and operable upon the breaking of said circuit, a relay having a normally closed contactor connected in said normally energized circuit, a relay for each of said motors electrically connected to the armature terminals thereof and operably responsive to the reaction voltage of said armature, each said motor relay having a normally open contactor in circuit with said first named relay and adapted to be closed upon operation of said motor relay to operate the said first named relay, and each motor relay having another normally open contactor in circuit with said safety device and the contactor of said first named relay and adapted to be closed upon operation of said motor relay, said safety device being operable upon the opening of the contactor of the first named relay and upon the non-closure of said other contactor of any one of said motor relays resulting from the non-generation of a reaction voltage by the stopped motor of said one relay.

5. An electrically operated safety mechanism for electrically propelled locomotives, vehicles and the like having a plurality of electric motors drivingly connected with a driving wheel assembly, said safety mechanism being operable upon cessation of operation of said motor resulting from the locking of any one of said wheel assemblies against rotation and comprising an electrically operated safety device in a normally energized circuit and operable upon the breaking of said circuit, a relay having a normally closed contactor connected in said normally energized circuit, a relay for each of said motors electrically connected to the armature terminals thereof and operably responsive to the reaction voltage of said armature, each said motor relay having a normally open contactor in circuit with said first named relay and adapted to be closed upon operation of said motor relay to operate the said first named relay, and each motor relay having another normally open contactor in circuit with said safety device and the contactor of said first named relay and adapted to be closed upon operation of said motor relay, said safety device and the normally open contactors of said motor relay being connected in series and said safety device being operable upon the opening of the contactor of the first named relay and upon the non-closure of said other contactor of any one of said motor relays resulting from the non-generation of a reaction voltage by the stopped motor of said one relay.

6. An electrically operated safety mechanism for electrically propelled locomotives, vehicles and the like having a plurality of electric motors drivingly connected with a driving wheel assembly, said safety mechanism being operable upon cessation of operation of said motor resulting from the locking of any one of said wheel assemblies against rotation and comprising an electrically operated signalling device in a normally deenergized circuit and operable upon the completion of said circuit, a relay having a normally open contactor connected in said circuit, a relay of each of said motors electrically connected to the armature terminals thereof and operably responsive to the reaction voltage of said armature, each said motor relay having a normally open contactor in circuit with said first named relay and adapted to be closed upon operation of said motor relay to operate the said first named relay and each said motor relay also having a normally closed contactor in circuit with said signalling device and the contactor of said first named relay and adapted to be opened upon operation of said motor relay, said signalling device being operable upon the closing of the contactor of the first named relay and upon the non-opening of said normally closed contactor of any one of said motor relays resulting from the non-generation of a reaction voltage by the stopped motor of said one relay.

7. An electrically operated safety mechanism for electrically propelled locomotives, vehicles and the like having a plurality of electric motors drivingly connected with a driving wheel assembly, said safety mechanism being operable upon cessation of operation of said motor resulting from the locking of any one of said wheel assemblies against rotation and comprising an electrically operated signalling device in a normally deenergized circuit and operable upon the completion of said circuit, a relay having a normally open contactor connected in said circuit, a relay for each of said motors electrically connected to the armature terminals thereof and operably responsive to the reaction voltage of said armature, each said motor relay having a normally open contactor in circuit with said first named relay and adapted to be closed upon operation of said motor relay to operate the said first named relay and each said motor relay also having a normally closed contactor in circuit with said signalling device and the contactor of said first named relay and adapted to be opened upon operation of said motor relay, said signalling device and said normally closed contactors of said motor relays being arranged in series with the normally closed contactors in parallel with each other, said signalling device being operable upon the closing of the contactor of the first named relay and upon the non-opening of said normally closed contactor of any one of said motor relays resulting from the non-generation of a reaction voltage by the stopped motor of said one relay.

8. An electrically operated safety mechanism for electrically propelled locomotives, vehicles and the like having a plurality of electric motors drivingly connected with a driving wheel assembly, said safety mechanism being operable upon cessation of operation of said motor resulting from the locking of any one of said wheel assemblies against rotation and comprising an electrically operated brake applying device in a normally energized circuit and operable upon the breaking of said circuit, a signalling device in a normally de-energized circuit and operable upon the completion of said circuit, a relay having a normally closed contactor connected in said energized circuit and a normally open contactor connected in said de-energized circuit, a relay for each of said motors electrically connected to the armature terminals thereof and operably responsive to the reaction voltage of said armature and each of said motor relays having three contactors, one contactor being a normally open contactor in circuit with said first named relay and adapted to be closed upon operation of said motor relay to operate said first named relay, the second being another normally open contactor in circuit with said brake applying device and the normally closed contactor of the first named relay, and the third being a normally closed contactor in circuit with said signalling device and the normally open contactor of said first named relay, said brake applying device being operable upon the opening of the normally closed contactor of the first named relay and upon the non-closure of the normally open contactor of any one of said motor relays and said signalling device being operable upon the closing of the normally open contactor of said first named relay and upon the non-opening of the said normally open contactor of said motor relay, resulting from the non-generation of a reaction voltage by the stopped motor of said one relay.

9. An electrically operated safety mechanism for electrically propelled locomotives, vehicles and the like having an electric motor drivingly connected with a set of driving wheels, said safety mechanism being operable upon cessation of operation of said motor and comprising an electrically operated safety device, a control relay connected with said safety device and the terminals of the motor armature and operable from one position to another upon the generation and non-generation of a reaction voltage by the rotation of the armature for controlling operation of the safety device, and a relay having a normally open contactor in circuit with said control relay and the armature terminals of said motor and operable to closed position upon the locking of said wheels against rotation to close said motor relay circuit for operation of said motor relay.

10. An electrically operated safety mechanism for electrically propelled locomotives, vehicles and the like having a plurality of wheel assemblies, a plurality of electric motors and driving connections between said motors and said wheel assemblies, said mechanism being operable upon breakage or slippage of the driving connection between any one of said motors and said assemblies and comprising an electrically operated brake applying device, and a high voltage relay associated with each motor and the contactors of said relays being electrically connected in parallel with said safety device for controlling operation thereof and said relays being electrically connected to the armature terminals of their associated motors and each having a normally open contactor adapted to close upon the generation of a high reaction voltage by the motor armature upon the slippage or breakage of said driving connection to said motor to effect operation of said brake applying device.

11. An electrically operated safety mechanism for electrically propelled locomotives, vehicles and the like having a plurality of wheel assemblies and a plurality of electric motors drivingly connected with said wheel assemblies, said mechanism being responsive to cessation of rotation of any one of the wheel assssemblies and its associated motor and to breakage or slippage of the driving connections between any said wheel assembly and its associated motor, said mechanism comprising an electrically operated safety device, a relay associated with each said motor and electrically connected to the armature terminals thereof and having a normally open contactor and a normally closed contactor responsive to the armature reaction voltage of said associated motor, another relay having a normally open contactor, the normally open contactors of said motor relays being connected in parallel with said other relay and adapted to close at a predetermined armature reaction voltage and the contactor of said other relay being adapted to close upon the closing of said normally open contactor of any of said motor relays for conditioning the circuit for automatic operation of said safety device and the normally closed contactors of said motor relays being connected in parallel with said other relay contactor and in circuit with said safety device and adapted to open upon generation of said reaction voltage and to close upon cessation of said reaction voltage upon the locking of any said wheel assembly and its associated motor against rotation, and a high voltage relay for each motor also connected to the armature terminals thereof and to said safety device having a normally open contactor adapted to close upon the generation of a high reaction voltage upon slippage or breakage of the driving connection between any wheel assembly and its associated motor to effect operation of said safety device.

HAROLD H. MAGILL.
CHARLES N. RECTOR.

References Cited in the file of this patent
UNITED STATES PATENTS

| Number | Name | Date |
|---|---|---|
| 1,371,559 | Hellmund | Mar. 15, 1921 |
| 1,513,247 | James | Oct. 28, 1924 |
| 2,020,947 | Kimball et al. | Nov. 12, 1935 |
| 2,332,584 | McCune | Oct. 26, 1943 |